Figure 1A:
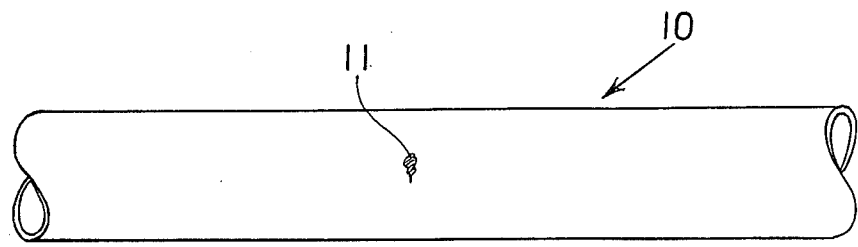

United States Patent [19]

Han

[11] 4,357,960
[45] Nov. 9, 1982

[54] PLUMBING METHOD AND COMPOSITION FOR USE IN SAME

[75] Inventor: Helen Han, San Jose, Calif.

[73] Assignee: Arthur S. Bittinger, Walnut Creek, Calif.

[21] Appl. No.: 780,754

[22] Filed: Mar. 24, 1977

[51] Int. Cl.³ .................... F16L 55/00; F16K 13/04
[52] U.S. Cl. ...................................... 138/97; 138/89; 252/316; 106/209
[58] Field of Search ............... 138/89, 97; 252/316; 106/209, 241

[56] References Cited

U.S. PATENT DOCUMENTS

| | | | |
|---|---|---|---|
| 2,175,137 | 10/1939 | Summers | 138/93 X |
| 2,241,963 | 5/1941 | Rosenthal | 106/209 X |
| 2,276,443 | 3/1942 | Wilson | 138/89 X |
| 2,277,286 | 3/1942 | Bechtner | 285/DIG. 26 |
| 3,130,063 | 4/1964 | Millmann et al. | 106/241 X |
| 3,146,113 | 8/1964 | Middleton et al. | 106/209 X |
| 3,338,499 | 8/1967 | Gilbert | 138/89 X |
| 3,496,952 | 2/1970 | Amendola | 138/89X |
| 3,615,794 | 10/1971 | Nimerick | 106/209 X |
| 3,852,076 | 12/1974 | Grasko | 106/209 X |
| 3,861,941 | 1/1975 | Brockett | 252/316 X |
| 3,895,956 | 7/1975 | Yoshida et al. | 106/209 X |
| 3,958,606 | 5/1976 | Viramontes | 138/89 X |
| 3,958,997 | 5/1976 | Greenberg | 106/38.5 R |
| 3,962,767 | 6/1976 | Byerley | 138/97 X |

Primary Examiner—James E. Bryant, III
Attorney, Agent, or Firm—Edward B. Gregg

[57] ABSTRACT

Repair of leaks in water pipes or installation of T's in water pipes by use of sleeves applied to open ends of cut pipe, preceded by insertion into open ends of plug material which shuts off flow of water, drying ends of pipe, installation of sleeve and flushing out plug or plugs after installation is complete; also preparation for same.

2 Claims, 6 Drawing Figures

U.S. Patent     Nov. 9, 1982     4,357,960

PLUMBING METHOD AND COMPOSITION FOR USE IN SAME

This invention relates to a method of repairing leaks in or installing T's in water pipe and to a sweat compound or composition for use in such repair of installation.

In the repair of a leak in a water pipe used for household water supply and drainage, it is customary to cut away a small segment of the pipe including the part wherein there is a leak and to insert in its place a small segment of pipe of similar or compatible material, fitting it over the open ends of the cut pipe so as to bridge the space between the open ends of the pipe. Similarly, if it is desired to tap a water pipe to provide a branch line, it is customary to cut away a segment of the pipe and, instead of inserting a simple length of pipe as in the case of the repair of a leak, a T is inserted. These conventional operations are illustrated and described below with reference to the drawings.

Household water pipe is commonly of copper or plastic construction, the plastic being typically polyvinylchloride (hereinafter referred to as "PVC"). In the case of copper pipe, the operation described above is carried out with a copper insert (that is, a straight length of pipe for leak repair or a T for tapping the pipe). When a PVC pipe is repaired or modified, the pipe segment inserted is of similar material, usually PVC. In the former case (copper pipe), the open ends of the cut pipe are cleaned and dried and a flux is applied to the outer surfaces of the open ends of the pipe. A copper pipe insert is placed over these ends and solder is applied. Then heat is applied to melt the solder and seal the joints. In the latter case (a PVC pipe), the insert (whether a straight length of pipe for leak repair or a T for tapping the pipe) a PVC pipe segment is employed. Open ends of the pipe, before installation of the insert, are treated with an adhesive, or the adhesive may be applied to the interior of the insert, or it may be applied to both ends of the cut pipe and to the interior of the insert. The adhesive used is a cold setting adhesive which will set and cure at ambient temperature.

In either case it is quite important that both ends of the pipe be dry. If water is present, even in a small amount, a faulty seal results and the work more than likely will have to be done over again.

These difficulties are aggravated and accentuated in those cases (which are not uncommon) where the pipe is located in close quarters as, for example, in the crawl space beneath the floor of a house where it is difficult to work.

It is difficult to avoid the presence of water in water pipe, whether it be a water supply pipe or a drain, because of leakage as, for example, from accumulated water in the plumbing system which wets the pipe surface even after it has been carefully dried.

It is an object of the present invention to provide improvements in plumbing operations of the character described.

It is a particular object of the invention to provide a means whereby the open ends of pipe that has been cut may be plugged securely so that after the pipe ends have been dried, they will remain dry until the insert (a straight length of pipe or a T) has been installed and a tight seal has been accomplished, the plug being of a type which, when water is turned on again, will disintegrate and/or dissolve and will wash down the drain.

The above and other objects of the invention will be apparent from the ensuing description and the appended claims.

Figure 1B:
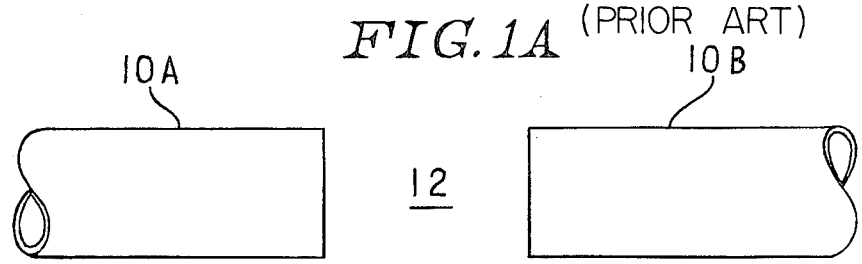
Figure 1C:
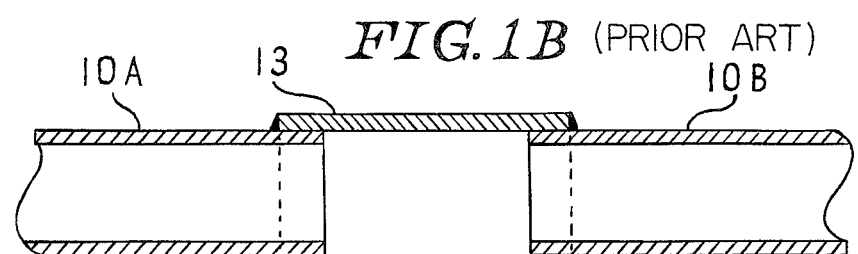
Figure 2A:
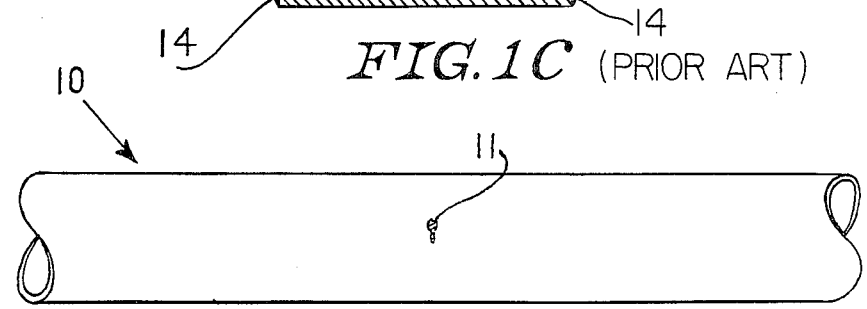
Figure 2B:
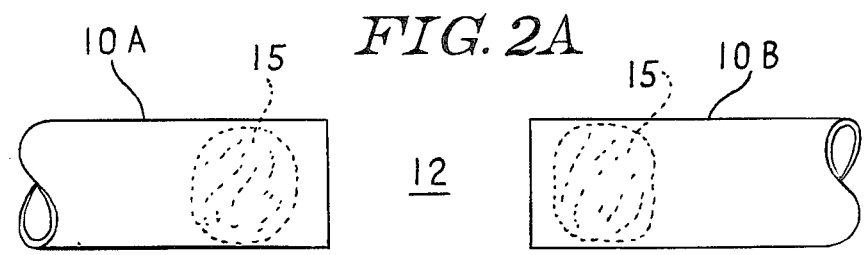
Figure 2C:
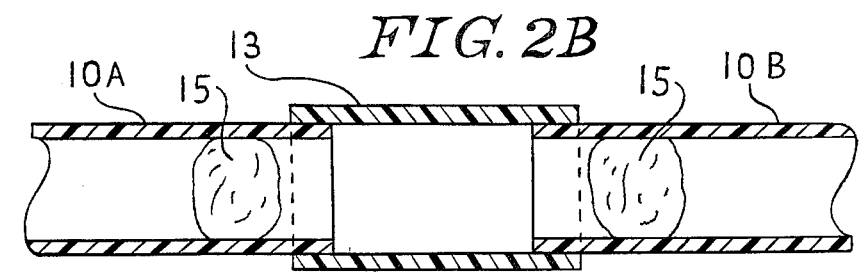

In the accompanying drawings,

FIGS. 1A, 1B and 1C represent diagrammatically successive stages in pipe repair in accordance with conventional practice, and FIGS. 2A, 2B and 2C represent corresponding stages in accordance with the invention. In both sets of figures, a straight length of pipe is installed to repair a leak, but it will be understood that similar operations are involved in tapping a pipe by inserting a T.

Referring now to FIG. 1A, a pipe 10 is shown having a leak indicated by the reference numeral 11. The pipe is cut on both sides of the leak, leaving two open pipe ends 10A and 10B and a gap 12 between the open ends of the pipe, as shown in FIG. 1B. The extent of the gap 11 may be typically about 2 inches. The outer surfaces of the open-ended sections of pipe 10A and 10B are cleaned and if the pipe is copper, the outer surfaces of the ends are coated with a flux (not shown). The interior of the open pipe ends are dried by swabbing and/or by application of heat. Then a segment of copper pipe 13 is applied over the open ends of the pipe sections 10A and 10B, which may be easily bent to allow access to and fitting the pipe segment 12 over them. Then solder is applied at 14 and thereafter the pipe length 13 and adjoining parts of the sections 10A and 10B are heated, e.g., by means of a torch, to melt the solder and effect a seal.

Referring now to FIGS. 2A, 2B and 2C, the same steps are carried out but a plastic plug 15 of suitable material such as described hereinafter is applied to one of the pipe lengths 10A or 10B or to both of them. The plug 15 is conveniently rolled into a sphere having a diameter somewhat larger than the internal diameter of the pipe so that when it is pushed in it will deform and provide a tight seal. Thereafter, the fitting 13 is applied and soldered as in the case of FIGS. 1A, 1B and 1C.

In the event that the pipe is plastic, e.g., PVC pipe, the same steps are carried out except that a suitable glue or adhesive is applied to the outer ends of the pipe sections 10A and 10B and/or to the inner surface of the segment 13.

Precisely the same operations are applied where, instead of repairing a leak, it is desired to insert a T, in which case instead of a straight length of pipe 12 a T is employed.

The plug material is prepared by mixing together an alginate and bentonite. The alginate may be any water-soluble alginate, for example sodium alginate. The alginates are salts of alginic acid. Alginic acid is derived from kelp and is a polysaccharide, more particularly believed to be largely copolymers of mannuronic acid and gluronic acid, the polymer chains being interbonded by water molecules. For purposes of the present invention any water soluble alginate may be used. The alginates are readily water-dispersible.

Bentonite is a clay which has the property of swelling when wetted and has strong adsorbing properties. Technically, it is known as sodium montmorillonite. A finely divided form of bentonite is preferred.

In the composition the alginate acts as a binder which binds together the bentonite particles. It disintegrates when it comes into contact with a stream of water as when, after the repair or installation has been made and has been properly sealed, the house water is turned on again. In the case of a drain pipe, water is caused to flow into the sink, toilet bowl, bathtub, shower, basin or whatever else is appropriate and is caused to flow out through the repaired or modified line.

Bentonite has a swelling property which causes it to swell; furthermore, of the two materials it is the less expensive and therefore it is preferably used in excess of the proportion of alginate. I have found that a 60:40 volume proportion of bentonite and alginate, respectively, is suitable.

If bentonite is used alone, it does not have sufficient binding properties and therefore is more likely to crumble before the pipe repair or modification has been completed.

Instead of bentonite other materials may be used, for example wood flour. However, wood flour may provide a nutrient medium for the growth of micro-organisms. Also, a material known as Centocell may be used in place of bentonite; also mixtures of bentonite and wood flour and/or Centocell.

Other binders may be used in place of or in admixture with alginate, for examples starch amylose; however, it is not as good a binder as the alginate. A further substitute for the alginate (or an additive thereto) is polyvinyl alcohol. However, a considerably larger proportion is required than of alginate.

The preferred plug material is a 60:40 by weight mixture of sodium alginate and bentonite which are mixed together and with water to provide a dough-like consistency, such that it can be rolled into a ball of suitable diameter, slightly exceeding that of the internal diameter of the pipe, and then thrust in to provide a tight plug sealing off the flow of water from the open ends of the pipe which are to receive a repair sleeve or a T.

When the plugs have been inserted and the repair pipe or T has been installed and adhered to the cut ends of the pipe, the flow of water is restored or, in the case of a drain pipe, water is caused to flow down into a drain and through the repaired or modified pipe. The plug or plugs disintegrate very rapidly and wash down into the sewer in the case of a drain pipe, or into an open sink, toilet bowl, bathtub or other household outlet, as the case may be, and thence into the drain and into the sewer.

The material used is harmless and non-toxic and it is not a nutrient medium for the growth of micro-organisms, and it does not constitute an environmental hazard.

It will therefore be apparent that a novel and advantageous method of pipe repair and of forming pipe connections has been provided, and that a very useful material for this purpose has been provided.

I claim:

1. A method of applying a sleeve-like connection between the spaced open ends of a cut pipe, said method comprising inserting into at least one of the open ends of the pipe a plug of plastic material formed of a mixture of a water soluble alginate and bentonite and of a size and shape to conform to the interior size and shape of the pipe to form a watertight seal, such plug having the property of sealing the pipe but of disintegrating readily upon flow of water in the pipe, then applying such a sleeve-like connection between the ends of the pipe by fitting it over the end portions of the pipe, sealing the resulting joints and thereafter causing flow of water in the pipe to disintegrate the plug or plugs and flush the same out of the pipe.

2. The method of claim 1, wherein the proportion of bentonite and alginate are approximately 60 parts of bentonite and 40 parts of alginate by volume.

* * * * *